US012759702B2

(12) United States Patent
Boertlein et al.

(10) Patent No.: US 12,759,702 B2
(45) Date of Patent: Oct. 13, 2026

(54) VERTICAL TAKE-OFF AND LANDING AIRCRAFT

(71) Applicant: Method Aeronautics, LLC, Falls Church, VA (US)

(72) Inventors: Neil Boertlein, McLean, VA (US); Daniel Hatfield, Arlington, VA (US); Jeremy Novara, Falls Church, VA (US)

(73) Assignee: METHOD AERONAUTICS, LLC, Falls Church, VA (US)

( * ) Notice: Subject to any disclaimer, the term of this patent is extended or adjusted under 35 U.S.C. 154(b) by 0 days.

(21) Appl. No.: 18/747,125

(22) Filed: Jun. 18, 2024

(65) Prior Publication Data

US 2024/0417073 A1 Dec. 19, 2024

Related U.S. Application Data

(60) Provisional application No. 63/508,987, filed on Jun. 19, 2023.

(51) Int. Cl.

*B64D 27/20* (2006.01)
*B64C 5/06* (2006.01)
*B64C 29/00* (2006.01)

(52) U.S. Cl.

CPC ............ *B64C 29/0033* (2013.01); *B64C 5/06* (2013.01); *B64D 27/20* (2013.01)

(58) Field of Classification Search

CPC ........ B64U 50/12; B64U 30/40; B64U 10/20; B64C 29/0075

See application file for complete search history.

(56) References Cited

U.S. PATENT DOCUMENTS 3,223,354 A 12/1965 Seibold et al.
3,347,497 A * 10/1967 Mullins ............... B64C 29/0058 244/54
3,385,066 A * 5/1968 Mullins ............... B64C 29/0075 60/228
10,029,785 B2 * 7/2018 Niedzballa ............. B64U 20/70

(Continued)

FOREIGN PATENT DOCUMENTS

CN 107336833 A 11/2017
CN 216443785 U 5/2022

(Continued)

OTHER PUBLICATIONS

U.S. Patent Application 18/747,187, filed Jun. 18, 2024, by Boertlein et al. (Copy not submitted herewith pursuant to the waiver of 37 C.F. R. § 1.98(a)(2)(iii) issued by the Office on Oct. 19, 2004).

(Continued)

*Primary Examiner* — Brian M O'Hara
(74) *Attorney, Agent, or Firm* — MICHAEL BEST & FRIEDRICH LLP

(57) ABSTRACT

A vertical take-off and landing (VTOL) aircraft configuration and control system includes a plurality of turbojet or turbofan engines providing vertical lift and control at hover and low airspeeds. In higher-speed flight, a separate cruise propulsion system generates thrust. Lift during this higher-speed flight is provided by one or more wings. During transition between low- and high-speed flight, both systems provide forward thrust, control and lift.

20 Claims, 7 Drawing Sheets

(56) References Cited

U.S. PATENT DOCUMENTS

| | | | | |
|---|---|---|---|---|
| 11,447,246 | B2 * | 9/2022 | Kunz | B64C 39/04 |
| 11,485,488 | B1 * | 11/2022 | Armer | B64C 29/0033 |
| 11,535,366 | B2 * | 12/2022 | Thalheimer | B64C 27/20 |
| 11,691,725 | B2 * | 7/2023 | Ivans | B64U 50/19 244/12.4 |
| 11,767,111 | B1 * | 9/2023 | Blake | B64U 10/20 244/17.11 |
| 11,919,630 | B2 * | 3/2024 | Baity | B64C 29/0033 |
| 11,939,050 | B2 | 3/2024 | Morris et al. | |
| 11,945,576 | B2 * | 4/2024 | Tighe | B64C 29/0025 |
| 12,246,819 | B1 * | 3/2025 | Groninga | B64C 15/12 |
| 2012/0091257 | A1 | 4/2012 | Wolff et al. | |
| 2012/0261523 | A1 | 10/2012 | Shaw | |
| 2016/0144957 | A1 | 5/2016 | Claridge et al. | |
| 2018/0057159 | A1 | 3/2018 | Ivans et al. | |
| 2018/0339761 | A1 | 11/2018 | McCullough et al. | |
| 2019/0127056 | A1 | 5/2019 | Weekes et al. | |
| 2019/0329863 | A1 | 10/2019 | King et al. | |
| 2020/0070968 | A1 | 3/2020 | Prager et al. | |
| 2020/0164993 | A1 | 5/2020 | Bevirt et al. | |
| 2021/0107640 | A1 | 4/2021 | Baity et al. | |
| 2021/0276704 | A1 * | 9/2021 | Pantalone | B64C 27/467 |
| 2022/0242557 | A1 | 8/2022 | Knoll et al. | |
| 2023/0067713 | A1 | 3/2023 | Burns et al. | |
| 2024/0208642 | A1 * | 6/2024 | Phillips | B64U 50/12 |
| 2024/0383604 | A1 * | 11/2024 | Marshman | B64D 1/08 |
| 2025/0083806 | A1 * | 3/2025 | Abramov | B64C 13/16 |

FOREIGN PATENT DOCUMENTS

| | | | | |
|---|---|---|---|---|
| CN | 117360811 | A * | 1/2024 | B64U 10/20 |
| WO | 2019109622 | A1 | 6/2019 | |
| WO | 2019190263 | A1 | 10/2019 | |

OTHER PUBLICATIONS

Bell Boeing V22 Brochure. Released in 2017. 2 pages.

International Search Report and Written Opinion for Application No. PCT/US2024/034530 dated Oct. 1, 2024 (16 pages).

International Search Report and Written Opinion for Application No. PCT/US2024/034538 dated May 29, 2025 (8 pages).

* cited by examiner

VERTICAL TAKE-OFF AND LANDING AIRCRAFT

CROSS-REFERENCE TO RELATED APPLICATIONS

This application claims priority to U.S. provisional patent application No. 63/508,987, filed Jun. 19, 2023, the entire contents of which are incorporated herein by reference.

BACKGROUND

The present disclosure relates to a vertical take-off and landing (VTOL) aircraft, more specifically to a VTOL aircraft with significant range and endurance requirements.

SUMMARY

In a first independent aspect, which may be combined with any other aspect, an aircraft includes a fuselage, a wing, a first engine, and a plurality of second engines. The wing is coupled to the fuselage, and the wing includes a first wing and a second wing. The first wing includes a first inboard wing and a first outboard wing connected by a first pod, and the second wing includes a second inboard wing and a second outboard wing connected by a second pod. The first engine is coupled to the fuselage and provides thrust in an axial direction. The plurality of second engines are operatively coupled to fuselage such that each second engine of the plurality of second engines provides thrust in a direction perpendicular to the axial direction and is rotatable toward the axial direction. Each second engine of the plurality of second engines is coupled to one of the first pod or the second pod. Further, each second engine of the plurality of second engines is rotatable toward the axial direction such that each second engine of the plurality of second engines is rotatable to be within an external profile of the respective one of the first pod or the second pod.

In another aspect, which may be combined with any other aspect, an aircraft includes a fuselage; a first engine coupled to the fuselage to provide thrust in an axial direction; and a plurality of second engines operatively coupled to the fuselage such that each second engine of the plurality of second engines provides thrust in a direction perpendicular to the axial direction and is rotatable toward the axial direction.

DETAILED DESCRIPTION

Preferred embodiments of the present disclosure are described herein with reference to the accompanying drawings. In the following description, well-known functions or constructions are not described in detail because they may obscure in unnecessary detail. As utilized herein, the term “exemplary” means serving as a non-limiting example, instance, or illustration. As utilized herein, the terms “e.g.” and “for example” set off lists of one or more nonlimiting examples, instances, or illustrations.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
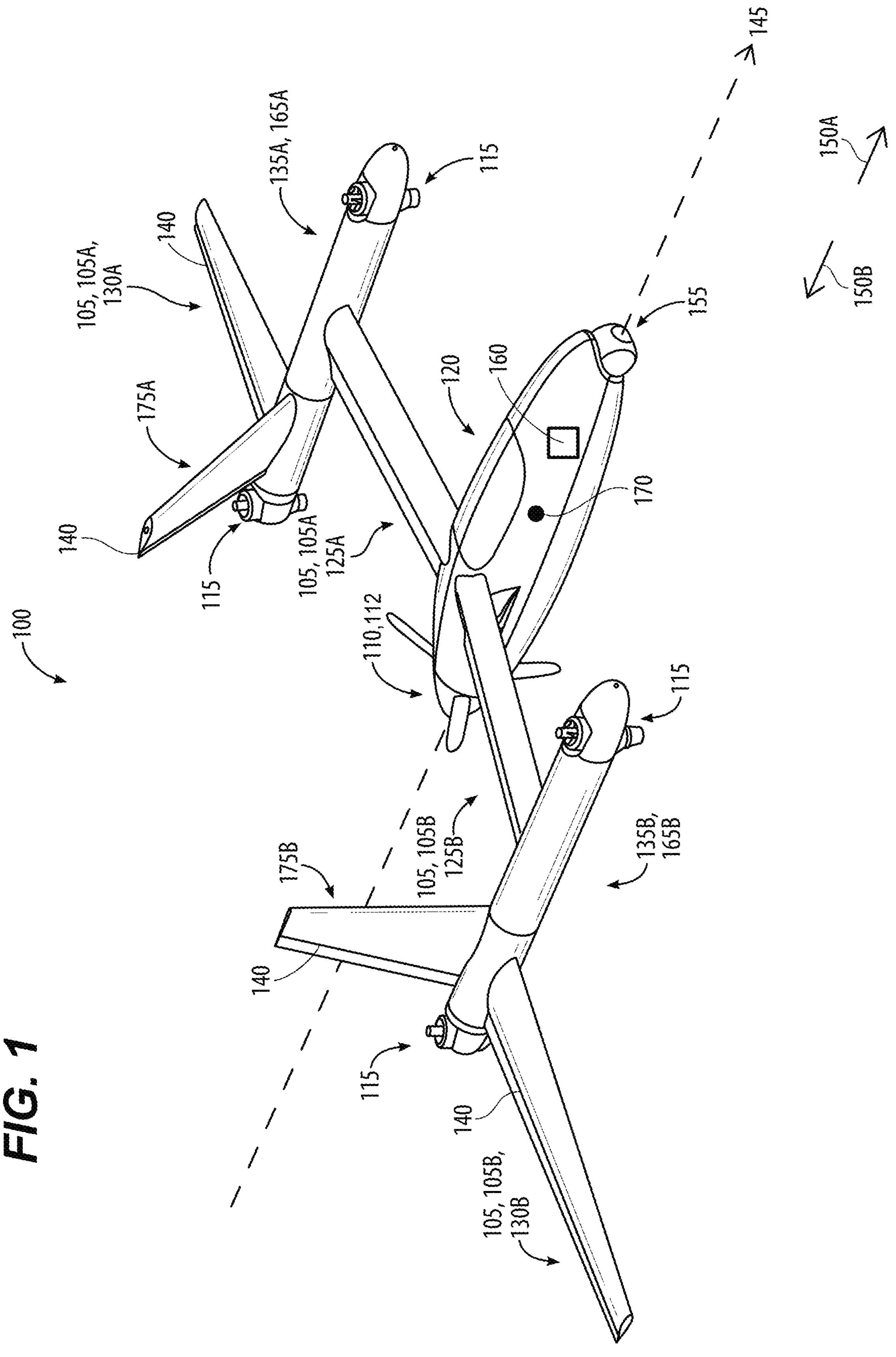
FIG. 1 illustrates a front perspective view of a first example aircraft.
Figure 2:
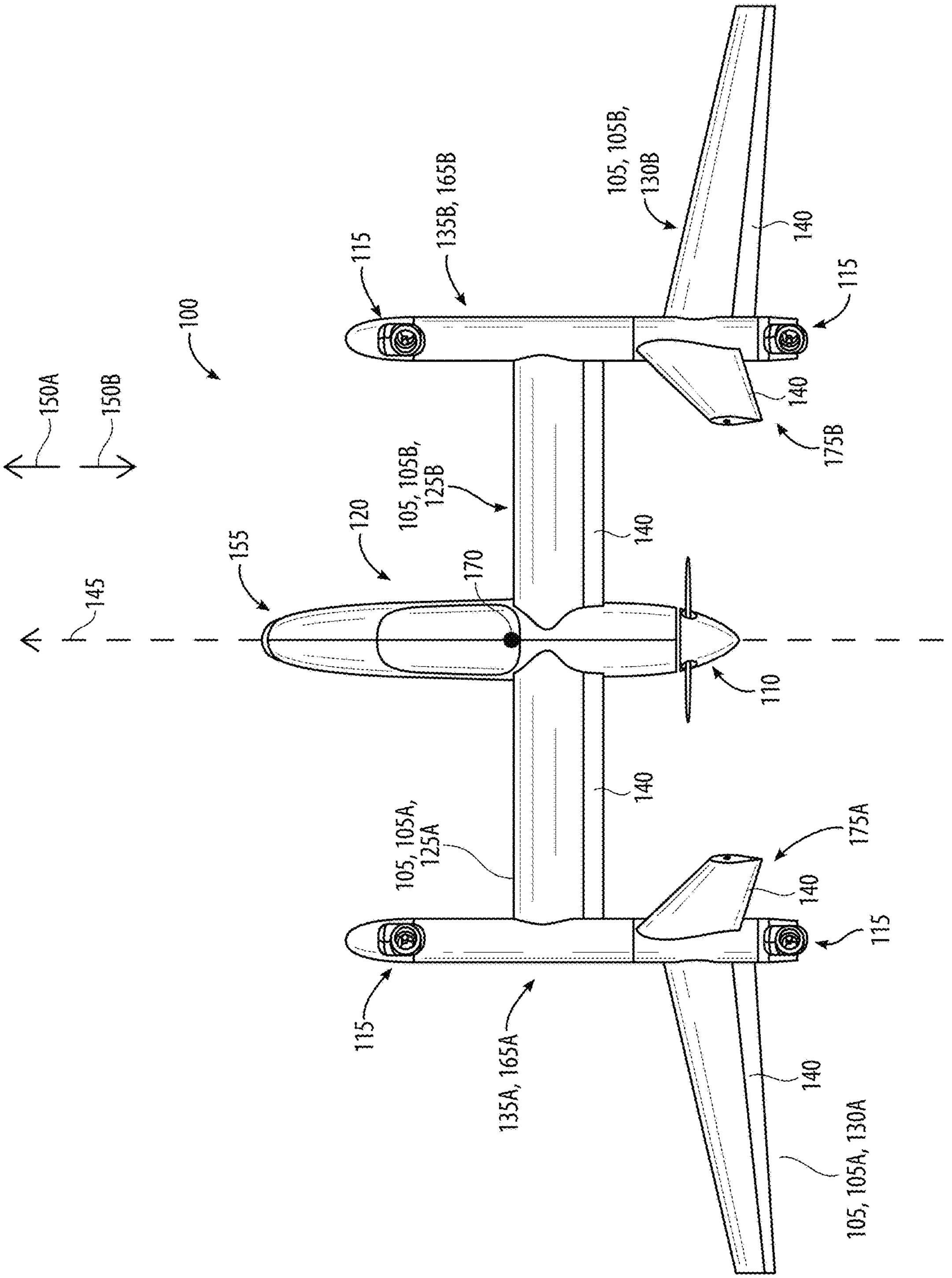
FIG. 2 illustrates a top plan view of the example aircraft of FIG. 1.

FIGS. 1 and 2 illustrate different views of a vertical take-off and landing (VTOL) aircraft, aircraft 100, more specifically an aircraft 100 with significant range and endurance requirements. The aircraft 100 achieves relatively higher speed, sustained, fuel efficient flight via a wing 105 and a first engine 110. In some embodiments, the wing 105 includes canards. Here, the term “higher-speed flight” is used to mean flight at airspeeds sufficiently above the aircraft 100 stall speed (i.e., the speed where the weight of the aircraft is substantially counteracted by lift generated by the wing 105) where lift and control can be safely maintained without supplementation from other engines, such as second engines 115. The term “low-speed flight” is used to mean flight at airspeeds at which the wing 105 and other aircraft 100 surfaces do not produce substantial lift.

The first engine 110 is a propeller operated by at least one selected from the group consisting of an internal combustion engine, a jet engine, and an electric motor, and operates the aircraft 100 at a cruise condition. As illustrated in FIG. 1, the first engine 110 is a pusher propeller. The aircraft 100 achieves vertical lift and control at hover and low airspeeds via a plurality of second engines, i.e., the second engines 115. The second engines 115 are turbojet engines, turbofan engines, or ducted fan engines (together, “jet” engines).

In some examples, a VTOL aircraft similar to the aircraft 100 employs a plurality of rotors for lift during hover and low speed, and a separate propulsion system of one or more motors dedicated to producing thrust during cruise. The lift rotors are only active during vertical take-off and landing, and the cruise propulsion system is only active during the higher-speed cruise portion of the flight. The lift rotors are typically driven by large electric motors and large banks of batteries. This makes the lift systems heavy, and the lift rotors are burdensome to store for cruise flight. In practice, the lift rotors are often left exposed during cruise flight, adding substantial drag, which reduces range, endurance, maximum speed and, climb performance. The large battery banks also create logistical and safety issues in operation. In other examples similar to the aircraft 100, a VTOL aircraft can employ one or more turbojet or turbofan engines for both vertical lift at low speeds and cruise thrust in higher-speed flight. These turbojet or turbofan engines are loud and inefficient in cruise flight, significantly limiting the range and endurance of such aircraft. Small turbojet engines are particularly inefficient, further limiting the range and endurance achievable on smaller unmanned aircraft utilizing jet propulsion.

The aircraft 100 shown in FIG. 1 addresses the drawbacks of these other proposed VTOL aircraft. The aircraft 100 includes a wing 105 coupled to a fuselage 120. The fuselage 120 has the first engine 110 coupled thereto. The first engine 110 provides thrust in an axial direction 145, which is generally aligned with a longitudinal axis of the generally cylindrical fuselage 120. In examples where the first engine includes a propellor 112, as shown in FIG. 1, the axial direction is collinear with a rotational axis of the propellor. The axial direction 145 includes a forward direction 150A and an aft direction 150B that is opposite the forward direction 150A. As the first engine 110 is a pusher propellor, the first engine is located toward the aft direction 150B of the fuselage 120. The first engine 110 propulsion may be from an internal combustion engine, an electric motor, a turboprop engine, or a combustion/electric hybrid. Embodiments utilizing combustion engines that can run on the same fuels as the jet engines (kerosene-based fuels, diesel fuels, and hydrogen for example) are particularly beneficial as the use of a common fuel decreases logistical requirements and increases mission flexibility.

In the embodiment shown in FIG. 1, a camera 155 is located toward the forward direction 150A of the fuselage 120, i.e., at the nose of the aircraft 100. The pusher propellor layout of the first engine 110 allows for data and sensing equipment to be positioned on the forward 150A portion of the fuselage 120. The fuselage also includes other components such as a controller 160 that is configured to control operation of the first engine 110, second engines 115, and control surfaces 140, e.g., ailerons, elevons, and flaps, on the wing 105 and control surfaces on vertical stabilizers 175A and 175B. In some examples of the aircraft 100, the controller 160 wirelessly receives signals to operate the aircraft such that the aircraft 100 is controlled in flight from a user in a location remote from the aircraft 100. In a preferred embodiment, the controller 160 uses feedback from a system of sensors (e.g., accelerometers, gyroscopes, GPS and engine RPM) to perform closed-loop control of the aircraft 100 position, attitude and velocity in performance of higher-level commands from a remote user or a mission autonomy system. In some examples, the second engines 115 are removeable such that the aircraft 100 can operate as a conventional takeoff and landing aircraft.

The wing 105 includes a first wing 105A and a second wing 105B. The first wing 105A includes a first inboard wing 125A and a first outboard wing 130A connected by a first pod 135A. The second wing 105B includes a second inboard wing 125B and a second outboard wing 130B connected by a second pod 135B. In the embodiment shown in FIG. 1, the first and second inboard wings 125A, 125B are located in the forward direction 150A along the axial direction 145 relative to the first and second outboard wings 130A, 130B.

The first pod 135A is generally cylindrical and includes an external profile 165A. The second pod 135B is also generally cylindrical and includes an external profile 165B. In the embodiment shown in FIG. 1, each of the first and second pods 135A, 135B includes two of the second engines 115. Thus, the second engines 115 are operatively coupled to the fuselage 120, but are not directly coupled to the fuselage 120. In other embodiments, as few as two of the second engines 115 are provided, i.e., one in each of the first and second pods 135A, 135B. In yet other embodiments, more of the second engines 115 are provided. Regardless of the number of second engines 115 that are provided, the second engines 115 are spaced such that a combined thrust from the second engines 115 is located at or near a center of mass 170 of the aircraft 100.

In some examples, each of the first and second pods 135A, 135B include a respective vertical stabilizer 175A, 175B. The first and second vertical stabilizers 175A, 175B both include control surfaces 140. In the embodiment shown in FIG. 1, the first vertical stabilizer 175A is located between the two second engines 115 on the first pod 135A. Likewise, the second vertical stabilizer 175B is located between the second engines 115 located on the second pod 135B. In other examples, no vertical stabilizers 175A, 175B are included on the aircraft 100.

The second engines 115 are operatively coupled to fuselage such that each of the second engines 115 provides thrust in a direction approximately perpendicular to the axial direction. The second engines are in this position when the aircraft 100 is taking off and landing. During takeoff and landing of the aircraft 100, the wing 105 is generally in a stall condition and provides no lift or only incidental lift. Thus, during takeoff and landing, lift for the aircraft 100 is only provided by the second engines 115.

As the aircraft 100 transitions from vertical flight during takeoff to horizontal flight (i.e., flight moving in the axial direction 145 such that the wing 105 generates lift), the second engines 115 rotate toward the axial direction 145. In the case of engines with a centerline (i.e., engines with a fan rotation axis like turbojet, turbofan, or ducted fan engines), rotating toward the axial direction 145 means rotating the centerline of the second engines 115 from a position perpendicular to the axial direction 145 toward the axial direction 145. This is best shown by contrasting FIGS. 5-10, which show examples of the second engines 115 in an operational position (i.e., in position to provide thrust during takeoff, vertical flight, and/or landing) and a stowed position (i.e., where the second engines 115 are rotated to be generally aligned with the axial direction 145).

Figure 5:
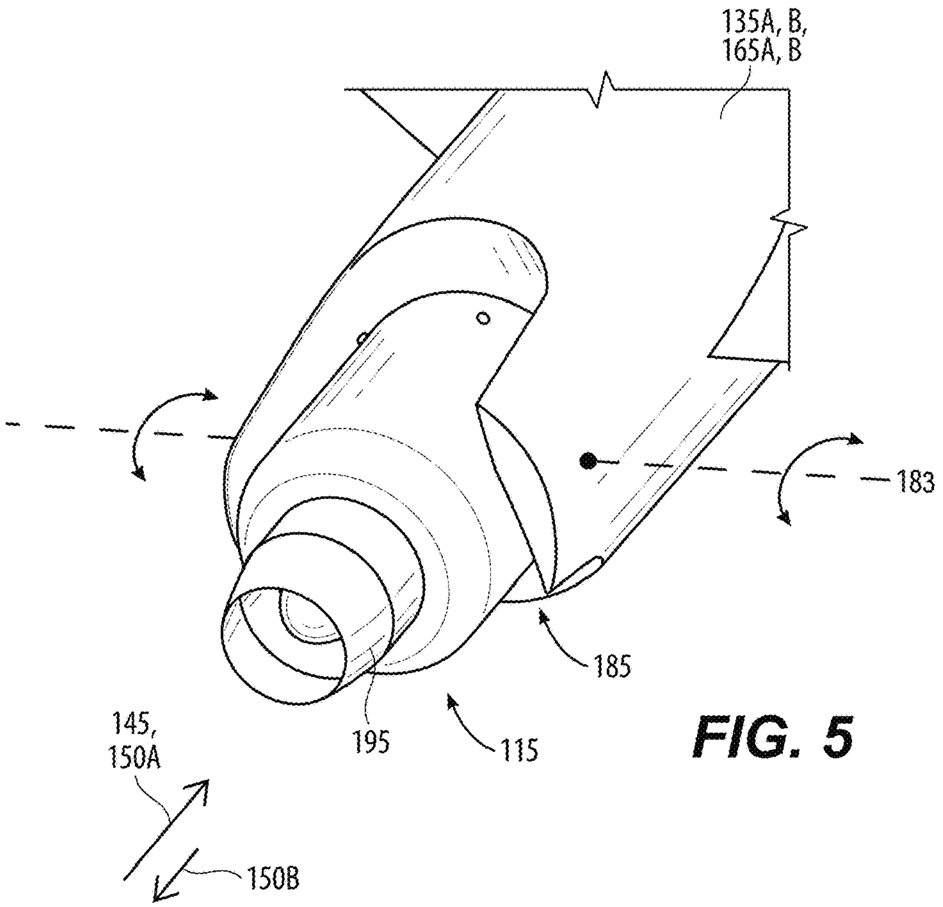
FIG. 5 illustrates a top perspective view of an aft second engine of an aircraft, where the second engine is in the stowed position.
Figure 6:
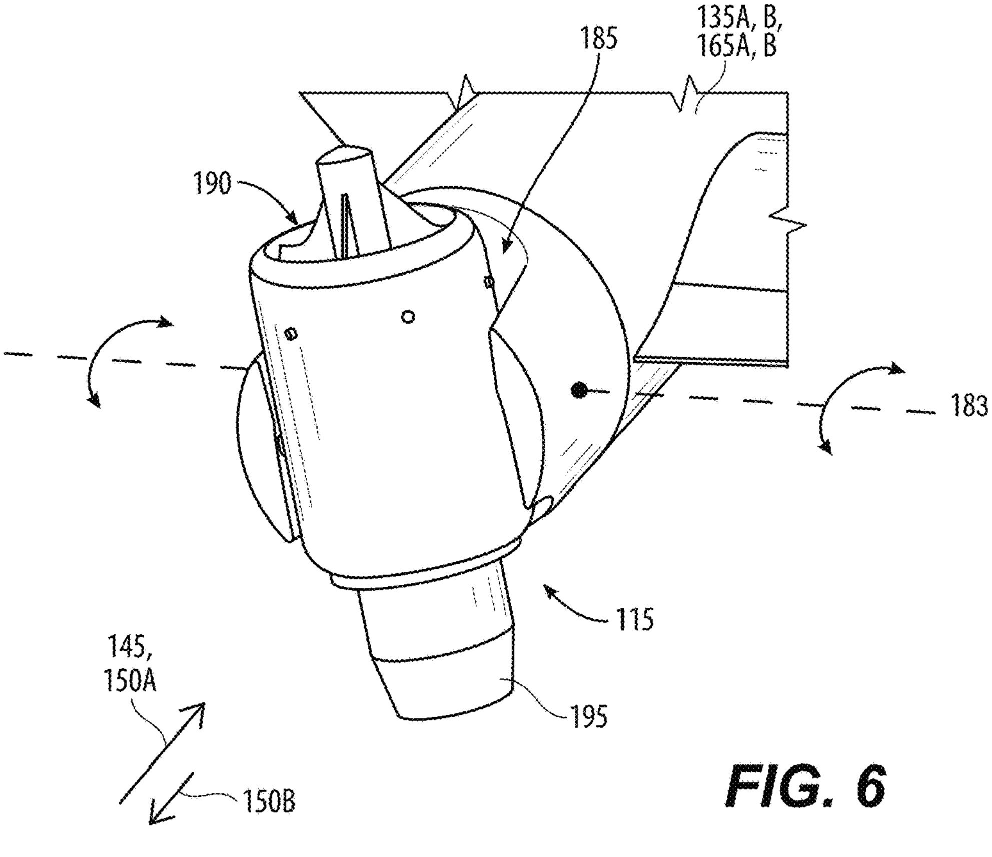
FIG. 6 illustrates a top perspective view of the aft second engine of an aircraft shown in FIG. 5, where the second engine is in the operational position.
Figure 7:
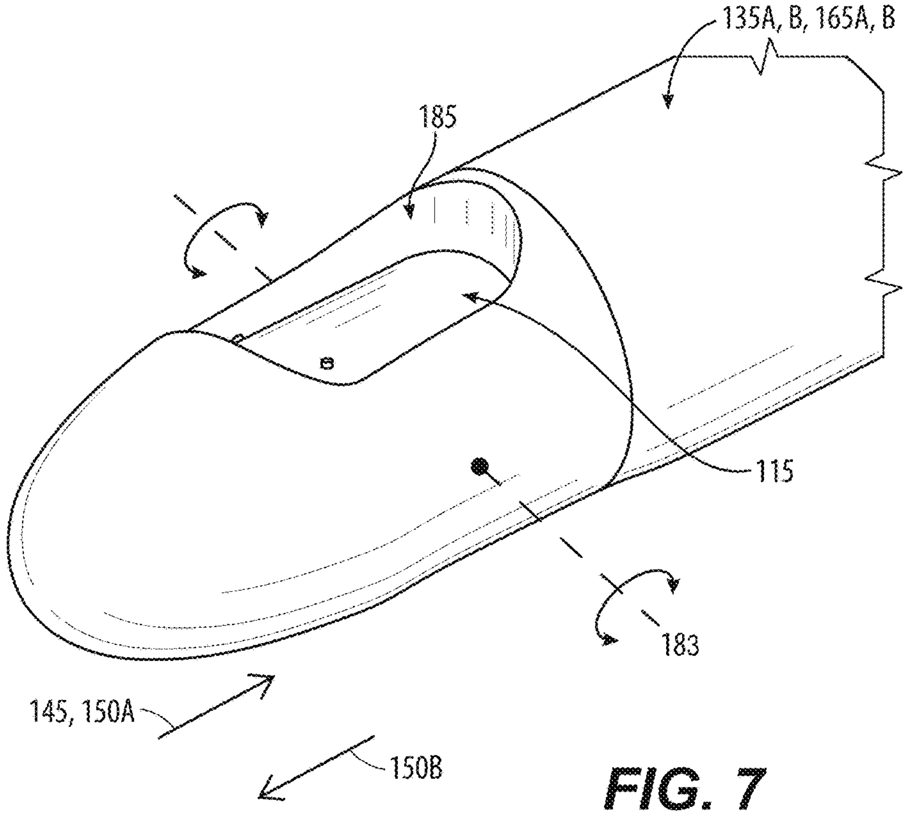
FIG. 7 illustrates a top perspective view of a forward second engine of an aircraft, where the second engine is in the stowed position.
Figure 8:
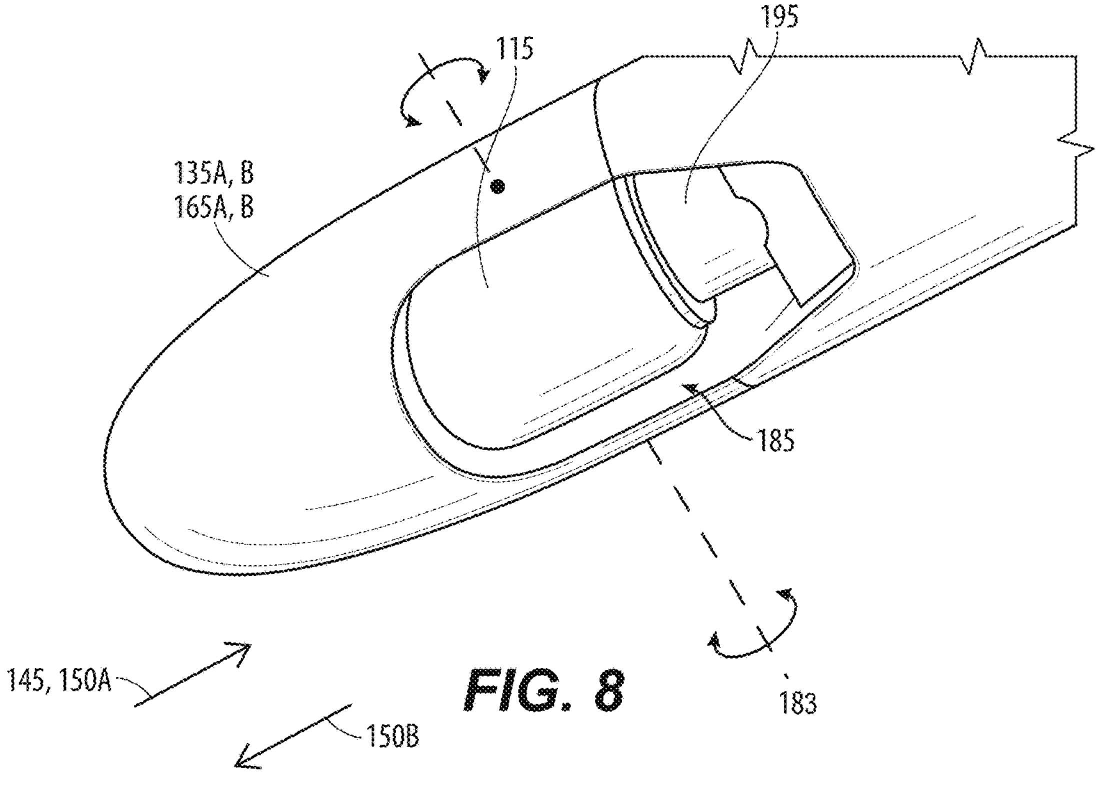
FIG. 8 illustrates a bottom perspective view of the forward second engine of an aircraft shown in FIG. 7, where the second engine is in the stowed position.
Figure 9:
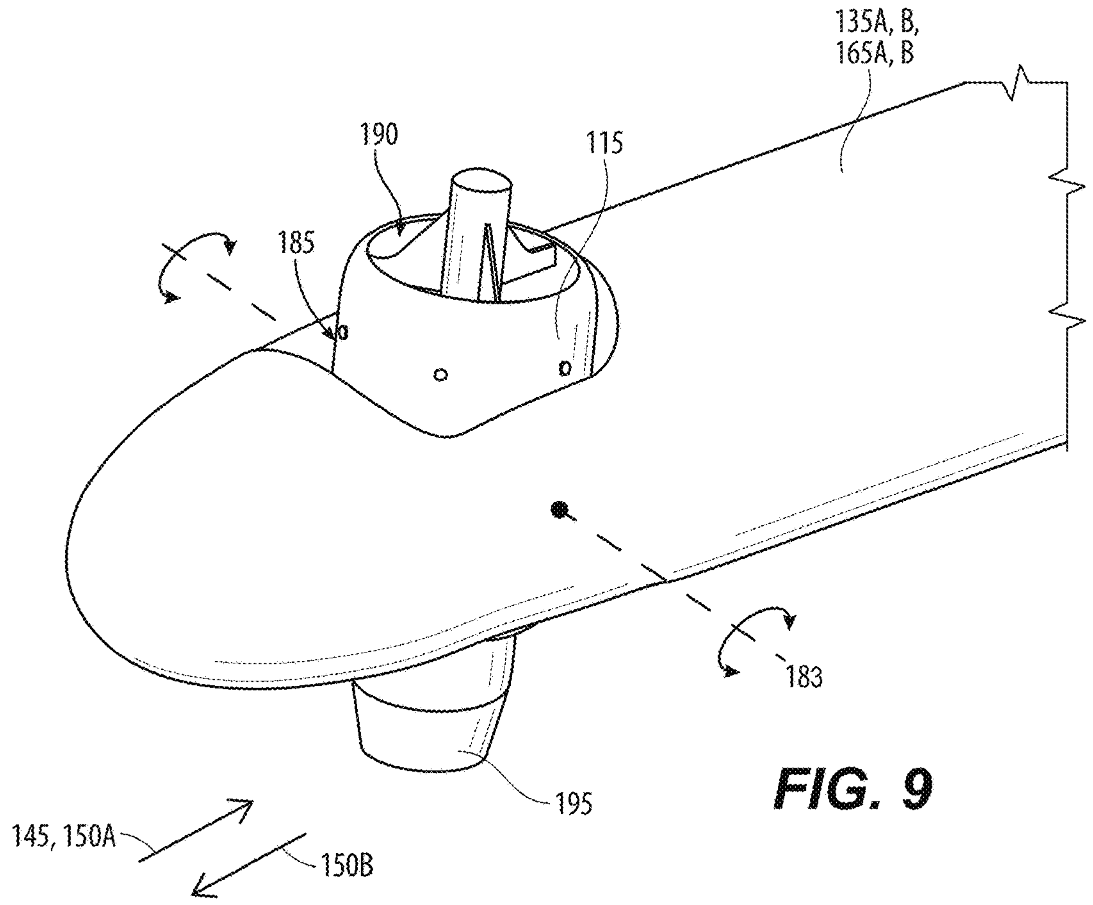
FIG. 9 illustrates a top perspective view of a forward second engine of an aircraft, where the second engine is in the operational position.
Figure 10:
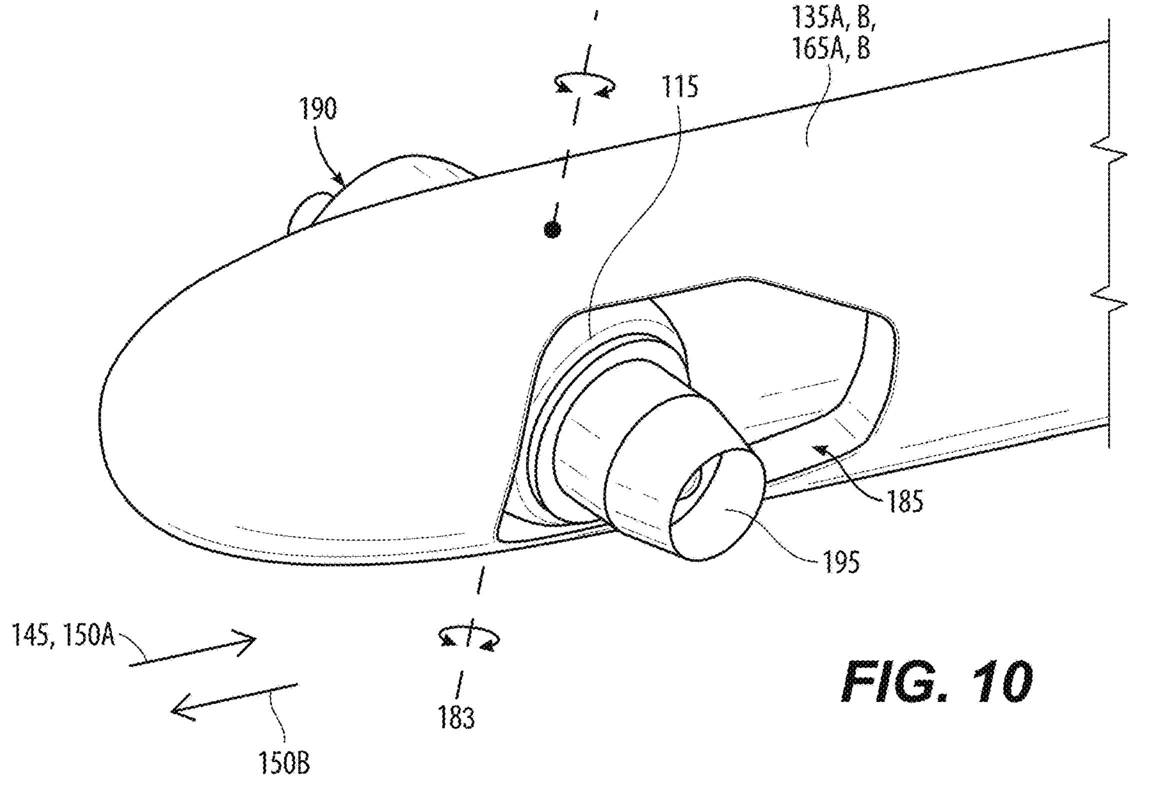
FIG. 10 illustrates a bottom perspective view of the forward second engine of an aircraft shown in FIG. 7, where the second engine is in the operational position.

Taking FIGS. 5 and 6 as an example, FIG. 5 illustrates the second engine 115 in the stowed position, while FIG. 6 illustrates the second engine 115 in the operational position. As the second engines 115 are rotated about a rotational axis 183 toward the axial direction 145, each of the second engines 115 is stowed within a cavity 185. As the second engines 115 are rotated toward the axial direction 145, the second engines provide thrust in the axial direction 145 until the second engines 115 are stowed. This provides some airspeed in the axial direction 145 until the first engine 110 takes over in providing primary power to the aircraft. When the second engines 115 are stowed, the second engines are entirely within the external profile 165A, 165B of first pod 135A or the second pod 135B on which the second engine 115 is mounted. Rotating the second engine 115 within the external profile 165A, 165B significantly reduces the drag of the aircraft during flight in the axial direction 145, which results in a significantly more efficient aircraft 100. Ideally, the second engines 115 fit tightly within the cavity 185 to reduce drag as much as possible. However, due to the tight fitment within the cavity 185, when the second engines 115 are stowed, the second engines are powered down. Otherwise, the first pod 135A and the second pod 135B would need to include complex ducting to feed air into and remove exhaust from the second engines 115. Further, this tight fitment eliminates the use of doors to seal the cavity 185, as any additional drag reduction provided by doors is already reduced by the tight fitment, so doors would only provide additional complexity without significant performance gain.

FIGS. 5 and 6 illustrate the second engine 115 at the aft 150B end of the first pod 135A or the second pod 135B, while FIGS. 7-10 illustrate the same phenomena with respect to the forward second engine 115 in the first pod 135A or the second pod 135B.

The second engines 115 are rotated about the rotational axis 183 to direct thrust along the axial direction 145 (e.g., at angles between +/−50 degrees from perpendicular to the axial direction 145, or in some embodiments, +50 degrees to −30 degrees from perpendicular to the axial direction 145), however, other fine adjustments must be made to thrust direction and thrust level of each engine so that the aircraft 100 can safely take off, land, transition to and from higher speed flight, and hover when needed. For example, the second engines 115 might need to correct for wind moving in a direction orthogonal to the axial direction 145. Each of the second engines 115 includes an inlet 190 and an exhaust nozzle 195. Air is sucked into the inlet 190, combustion occurs, and exhaust is directed out of the exhaust nozzle 195. For fine-tuning the direction of thrust from each of the second engines 115, the exhaust nozzle 195 is adjustable and can be gimbaled. Further, the second engines 115 are individually adjustable (e.g., in gimbal position and position about the respective rotational axis 183) so that the second engines 115 can together provide thrust in a desired direction so that the aircraft 100 can perform an operation such as taking off, landing, and hovering while correcting for other external factors, such as wind.

Figure 3:
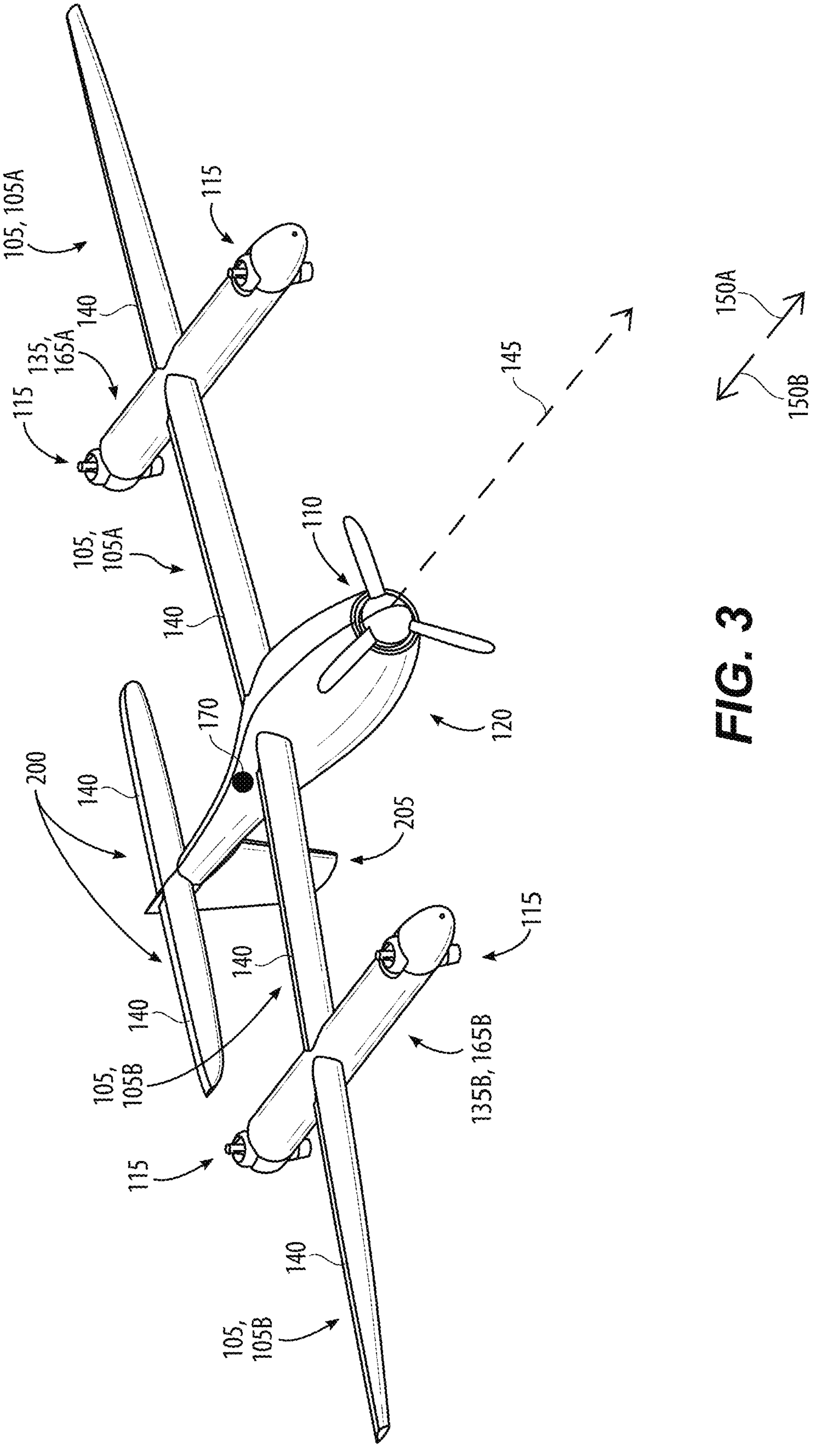
FIG. 3 illustrates a front perspective view of a second example aircraft.
Figure 4:
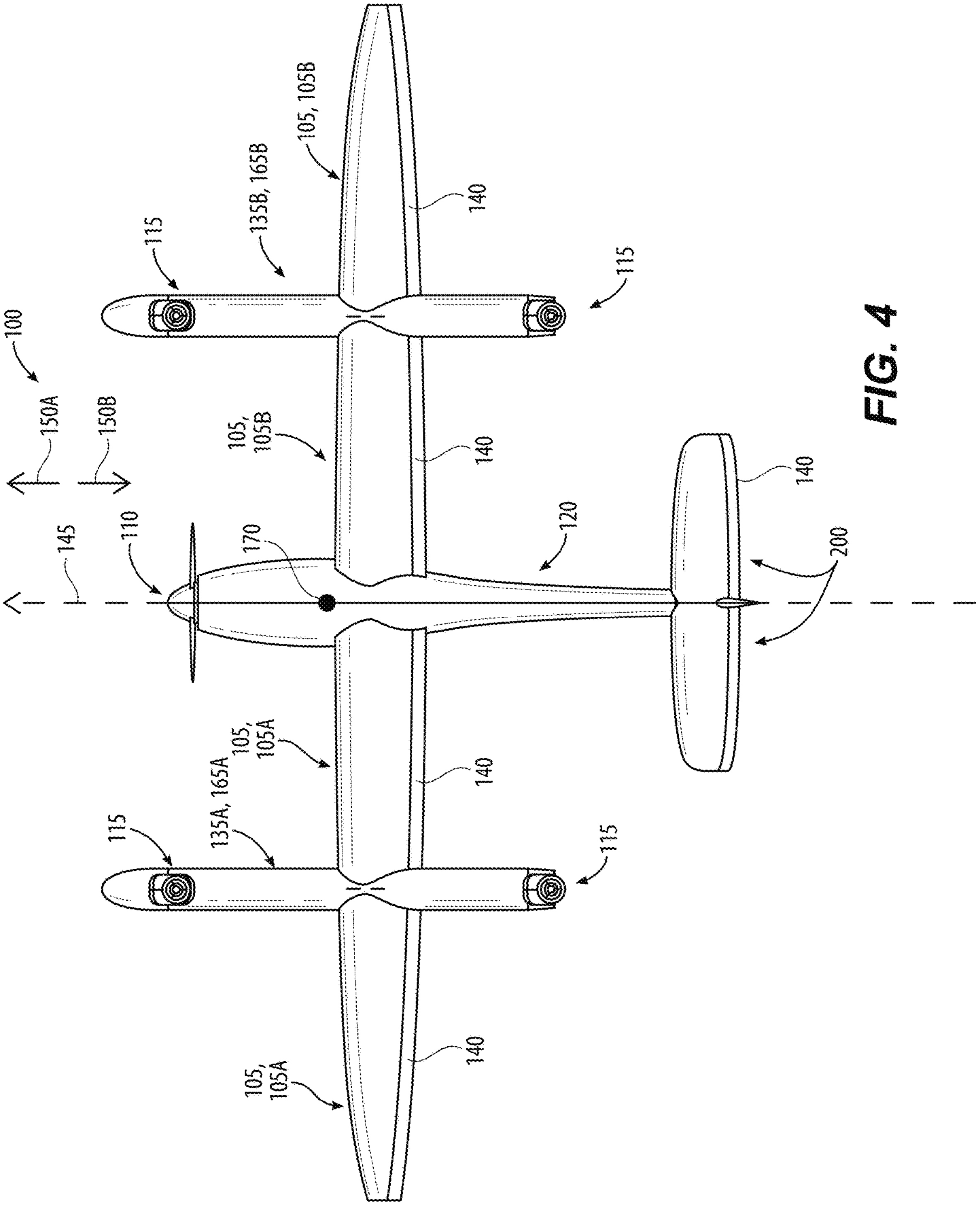
FIG. 4 illustrates a top plan view of the example aircraft of FIG. 3.

FIGS. 3 and 4 illustrate an embodiment of the aircraft 100 with differences from the aircraft 100 shown in FIGS. 1 and 2. For example, the first engine 110 is in a tractor propeller configuration. The fuselage is elongated in the aft 150B direction and includes a horizontal stabilizer 200 and vertical stabilizer 205 at the extreme aft end. The horizontal stabilizer 200 and vertical stabilizer 205 include control surfaces 140 such as rudders, ailerons, and flaps. Thus, the first and second pods 135A, 135B do not include vertical stabilizers 175A, 175B like those shown in FIGS. 1 and 2. Other examples of the aircraft 100 use an upwardly directed vertical tail arrangement or a variety of other tail configurations, including V-tails, A-tails, and T-tails.

Further, the wing 105 of the aircraft 100 shown in FIGS. 3 and 4 is substantially uniform across the aircraft 100 with respect to the axial direction 145. The wing 105 extends out on opposite sides of the fuselage 120 substantially perpendicularly to the axial direction 145. The first and second pods 135A, 135B are mounted on or suspend from the wing 105 on opposite sides of the fuselage 120. Like the aircraft shown in FIGS. 1 and 2, two second engines 115 are mounted on the first pod 135A at forward 150A and aft 150B positions and two second engines 115 are mounted on the second pod 135B at forward 150A and aft 150B positions. The second engines 115 function the same as described with respect to the second engines 115 shown in FIGS. 1 and 2.

Together, the first engine 110 and second engines 115 provide a dynamic flight envelope for the aircraft 100. The aircraft 100 uses the first and second engines 110, 115 for lift, thrust, position control, and attitude control during vertical takeoff, vertical landing, and low speed flight. Attitude and position control at low speed is performed by changing the thrust level and direction of the second engines 115. As shown in FIGS. 1-4, at least some of the second engines 115 are offset from the center of mass 170 such that varying the thrust magnitude and thrust direction or line produces torques on the aircraft 100 sufficient for attitude control. The thrust of the second engines 115 may also be directed forward 150A and aft 150B to assist in accelerating and decelerating the aircraft along the axial direction 145 through a transition between low-speed flight and higher-speed flight. Roll, pitch, and vertical velocity are controlled by varying the thrust of the second engines 115. Thrust variation in the second engines 115 may be produced by varying throttle (fuel flow), by varying the jet exit nozzle geometry, and by varying a blockage of the jet exhaust flow.

During transition between low-speed and higher-speed flight, lift, attitude control, velocity control and position control are provided by a combination of the low-speed and higher-speed controls. This blend of controls may vary with airspeed and with other factors such as the aircraft 100 weight, altitude, and system operational adjustments. In some examples the aircraft may have eight second engines 115, operated in pairs, which may provide redundancy and improved control bandwidth.

In some examples, the aircraft 100 is be equipped with landing gear that allows for a jet-assisted rolling takeoff. This "short takeoff" capability may provide for an increased take-off lift capacity. This short take-off capability may be in place of or in addition to a vertical take-off capability.

In any configuration, the fuselage 120, pods 135A, 135B, wing 105, and vertical stabilizers 175A, 175B may house sensors, cargo, flight control equipment, landing gear, fuel, batteries, antennas and other aircraft system and payload components as may be best conducive to the particular vehicle arrangement and mission.

What is claimed is:

1. An aircraft comprising:
a fuselage;
a wing coupled to the fuselage, the wing including a first wing and a second wing, the first wing including a first inboard wing and a first outboard wing connected by a first pod, and the second wing including a second inboard wing and a second outboard wing connected by a second pod;
a first engine coupled to the fuselage and configured to provide thrust to the aircraft in an axial direction; and
a plurality of second engines, each second engine of the plurality of second engines being coupled to the first pod or the second pod such that each second engine of the plurality of second engines is configured to provide thrust to the aircraft in a direction perpendicular to the axial direction and to rotate toward the axial direction, each second engine of the plurality of second engines being coupled to one of the first pod or the second pod,
wherein each second engine of the plurality of second engines includes an inlet and an exhaust nozzle,
wherein the entirety of the exhaust nozzle is configured to rotate within an external profile of one of the first pod or the second pod, and
wherein the exhaust nozzle is gimbaled.

2. The aircraft of claim 1, wherein each second engine of the plurality of second engines is spaced such that a combined thrust from the plurality of second engines is located at a center of mass of the aircraft.

3. The aircraft of claim 2, wherein a first vertical stabilizer is positioned on the first pod between two second engines of the plurality of second engines mounted on the first pod, and wherein a second vertical stabilizer is positioned on the second pod between two second engines of the plurality of second engines mounted on the second pod.

4. The aircraft of claim 1, wherein each second engine of the plurality of second engines is configured to, as each second engine of the plurality of second engines is rotated toward the axial direction, provide thrust to accelerate the aircraft in the axial direction.

5. The aircraft of claim 1, wherein the first engine includes a propellor, and wherein the axial direction is collinear to an axis of rotation of the propellor.

6. The aircraft of claim 1, wherein each second engine of the plurality of second engines is configured to power down while rotating toward the axial direction.

7. The aircraft of claim 1, wherein the second inboard wing is offset in the axial direction from the second outboard wing, and wherein the first inboard wing is offset in the axial direction from the first outboard wing.

8. The aircraft of claim 1, wherein the plurality of second engines is configured to provide thrust to the aircraft when the wing is in a stall condition.

9. The aircraft of claim 8, wherein the aircraft is configured to take off vertically or conventionally.

10. An aircraft comprising:

a fuselage;

a first engine coupled to the fuselage and configured to provide thrust to the aircraft in an axial direction;

a first pod;

a second pod; and a plurality of second engines, each second engine of the plurality of second engines coupled to the first pod or the second pod such that each second engine of the plurality of second engines is configured to provide thrust to the aircraft in a direction perpendicular to the axial direction and to rotate toward the axial direction, and wherein each second engine of the plurality of second engines includes an inlet and an exhaust nozzle, wherein the entirety of the exhaust nozzle is configured to rotate within an external profile of the first pod or the second pod, and wherein the exhaust nozzle is gimbaled.

11. The aircraft of claim 10, wherein the aircraft includes a wing having a first wing and a second wing, wherein the first wing includes a first inboard wing and a first outboard wing connected by the first pod, and wherein the second wing includes a second inboard wing and a second outboard wing connected by the second pod.

12. The aircraft of claim 11, wherein two second engines of the plurality of second engines are mounted on the first pod and two second engines of the plurality of second engines are mounted on the second pod, and wherein each exhaust nozzle of each of the two second engines of the plurality of second engines mounted on the first pod is configured to rotate within an external profile of the first pod and each exhaust nozzle of each of the two second engines of the plurality of second engines mounted on the second pod is configured to rotate within an external profile of the second pod.

13. The aircraft of claim 12, wherein each second engine of the plurality of second engines is spaced such that a combined thrust from the plurality of second engines is located at a center of mass of the aircraft.

14. The aircraft of claim 13, wherein the plurality of second engines are turbofan engines.

15. The aircraft of claim 13, wherein the plurality of second engines are turbojet engines.

16. The aircraft of claim 10, wherein the first engine includes a propeller operated by at least one selected from the group consisting of an internal combustion engine, a jet engine, and an electric motor.

17. The aircraft of claim 16, wherein the first engine is a pusher propeller including a propellor, and wherein the axial direction is collinear to an axis of rotation of the propellor.

18. The aircraft of claim 12, wherein the first pod includes a first vertical stabilizer, and wherein the second pod includes a second vertical stabilizer.

19. The aircraft of claim 18, wherein the first vertical stabilizer, the second vertical stabilizer, and the wing include control surfaces.

20. The aircraft of claim 10, wherein each second engine of the plurality of second engines is configured to rotate between an axial orientation, in which a respective centerline of each second engine is parallel to the axial direction, and a take-off orientation, in which the respective centerline of each second engine is perpendicular to the axial direction, wherein, in the axial orientation, each exhaust nozzle of each second engine of the plurality of second engines is located within an external profile of the first pod or the second pod, wherein, in the take-off orientation, each exhaust nozzle of each second engine of the plurality of second engines extends outside of the external profile of the first pod and the second pod, and wherein the exhaust nozzle of each second engine of the plurality of second engines is configured to be individually controlled.

* * * * *